(12) United States Patent
Lakkundi et al.

(10) Patent No.: US 9,983,847 B2
(45) Date of Patent: *May 29, 2018

(54) NOMADIC DEVICE FOR CONTROLLING ONE OR MORE PORTABLE SPEAKERS

(71) Applicant: Harman International Industries, Inc., Stamford, CT (US)

(72) Inventors: Ravi Lakkundi, Bangalore (IN); Shyam Vedantam, Bangalore (IN)

(73) Assignee: Harman International Industries, Incorporated, Stamford, CT (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/283,808

(22) Filed: Oct. 3, 2016

(65) Prior Publication Data

US 2017/0024185 A1 Jan. 26, 2017

Related U.S. Application Data

(63) Continuation of application No. 13/603,916, filed on Sep. 5, 2012, now Pat. No. 9,462,384.

(51) Int. Cl.
*H04R 5/00* (2006.01)
*G06F 3/16* (2006.01)
*H04R 3/14* (2006.01)
*H04R 5/04* (2006.01)
*H04S 1/00* (2006.01)
*H04S 7/00* (2006.01)
(Continued)

(52) U.S. Cl.
CPC ............. *G06F 3/165* (2013.01); *H04R 3/14* (2013.01); *H04R 5/04* (2013.01); *H04S 1/007* (2013.01); *H04S 7/308* (2013.01); *H04R 2420/07* (2013.01); *H04S 5/005* (2013.01); *H04S 5/02* (2013.01)

(58) Field of Classification Search
CPC .. G06F 3/165; H04R 3/14; H04R 5/04; H04R 2420/07; H04S 1/007; H04S 7/308; H04S 5/005; H04S 5/02
USPC .................... 381/1, 303, 315, 99, 17, 77, 81
See application file for complete search history.

(56) References Cited

U.S. PATENT DOCUMENTS 5,384,855 A * 1/1995 Kwang .................... H04R 3/14
381/100
5,781,642 A 7/1998 Tanaka et al.
(Continued)

OTHER PUBLICATIONS http://www.dolby.com/us/en/consumer/technology/home-theater/dolby-virtual-speaker-details, "Realistic Surround Sound from Two Speakers", Jan. 1, 2012, 1 page.
(Continued)

*Primary Examiner* — Norman Yu
(74) *Attorney, Agent, or Firm* — Brooks Kushman P.C.

(57) ABSTRACT

An apparatus for receiving audio data from a nomadic device is provided. The apparatus comprises a first portable speaker for being operably coupled to the nomadic device. The nomadic device receives first information indicative of a first crossover frequency for the first portable speaker and determines the first crossover frequency based on the first information. The nomadic device transmits the audio data to the first portable speaker in accordance to the first crossover frequency. The first portable speaker is configured to playback the audio data at the first crossover frequency.

18 Claims, 4 Drawing Sheets

(51) Int. Cl.
    *H03G 5/00* (2006.01)
    *H04S 5/00* (2006.01)
    *H04S 5/02* (2006.01)

(56) References Cited

U.S. PATENT DOCUMENTS

| | | | |
|---|---|---|---|
| 8,494,189 B2 | 7/2013 | Katayama | |
| 8,554,133 B1* | 10/2013 | Feldman | H04H 20/61 |
| | | | 455/3.06 |
| 2006/0193482 A1* | 8/2006 | Harvey | H04R 1/1016 |
| | | | 381/74 |
| 2007/0121981 A1 | 5/2007 | Koh et al. | |
| 2008/0207123 A1 | 8/2008 | Andersen | |
| 2009/0304186 A1 | 12/2009 | Katayama et al. | |
| 2012/0121111 A1 | 5/2012 | Sim et al. | |
| 2012/0148075 A1 | 6/2012 | Goh et al. | |
| 2012/0190406 A1 | 7/2012 | Chen | |

OTHER PUBLICATIONS http://www.dolby.com/us/en/consumer/technology/home-theater/dolby-virtual-speaker.html, "Realistic Surround Sound from Two Speakers", Jan. 1, 2012, 1 page.

http://accessories.nokia.com/featured-story/nokia-play-360%C2%B0/, "Nokia Play 360°—Loud and Gear", Jun. 21, 2011, 13 pages.

http://accessories.nokia.com/products/nokia-play-360%c2%b0/, "Nokia Play 360°—Loud and Gear", Jun. 22, 2011, 12 pages.

U.S. Office Action for corresponding U.S. Appl. No. 13/603,916, dated Sep. 10, 2014, 18 pages.

U.S. Office Action for corresponding U.S. Appl. No. 13/603,916, dated Mar. 2, 2015, 15 pages.

U.S. Office Action for corresponding U.S. Appl. No. 13/603,916, dated Jul. 16, 2015, 16 pages.

U.S. Office Action for corresponding U.S. Appl. No. 13/603,916, dated Feb. 9, 2016, 15 pages.

* cited by examiner

NOMADIC DEVICE FOR CONTROLLING ONE OR MORE PORTABLE SPEAKERS

CROSS-REFERENCE TO RELATED APPLICATIONS

This application is a continuation of U.S. application Ser. No. 13/603,916 filed Sep. 5, 2012, now U.S. Pat. No. 9,462,384 the disclosure of which is hereby incorporated in its entirety by reference herein.

TECHNICAL FIELD

Embodiments disclosed herein generally relate to a nomadic device for controlling one or more portable speakers.

BACKGROUND

It is known to playback multimedia data as stored on a portable device. One example of such an implementation is set forth in U.S. Patent Publication No. 2012/0190406 ("the '406 Publication") to Chen.

The '406 Publication provides a docking station and a portable device. The docking station includes an expansion port, a controller, and a transceiver. The expansion port is configured to be attached to a portable device. The controller is coupled to the expansion port and configured to determine whether the portable device is attached to the expansion port and to copy multimedia data from the portable device to a media storage device upon the attachment. The transceiver is coupled to the controller and is configured to receive a command signal from the portable device. The controller is further configured to control playback of the copied multimedia data in response to the command signal.

SUMMARY

In at least one embodiment, an apparatus for receiving audio data from a nomadic device is provided. The apparatus comprises a first portable speaker for being operably coupled to the nomadic device. The nomadic device receives first information indicative of a first crossover frequency for the first portable speaker and determines the first crossover frequency based on the first information. The nomadic device transmits the audio data to the first portable speaker in accordance to the first crossover frequency. The first portable speaker is configured to playback the audio data at the first crossover frequency.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, RAM, ROM, EPROM, EEPROM, or other suitable variants thereof) and software which co-act with one another to perform operation(s) disclosed herein.

The embodiments disclosed herein generally provide for a nomadic device that is configured to wirelessly transmit audio data to one or more portable speakers for audio playback. The nomadic device generally includes a display and an application for, but not limited to, enabling a user to enter the number of speakers in used a system, a distance between two or more speakers, and a size for each speaker, etc. The nomadic device may provide various sound enhancements or post processing capabilities such as, but not limited to, low-bitrate enhancers, stereo effects/widening, and up-mixing/multichannel enhancements, etc. Each portable speaker is configured to perform an initial pairing setup to enable receipt of the audio data from the nomadic device. Each speaker is further configured to operate in a friend mode to indicate that such a corresponding speaker is providing the audio playback along with another speaker. While in the friend mode, a first speaker decodes the audio data as transmitted from the nomadic device on a first channel and a second speaker decodes the audio data as transmitted from the nomadic device on a second channel, and so on. These features and other will be discussed in more detail below.

Figure 1:
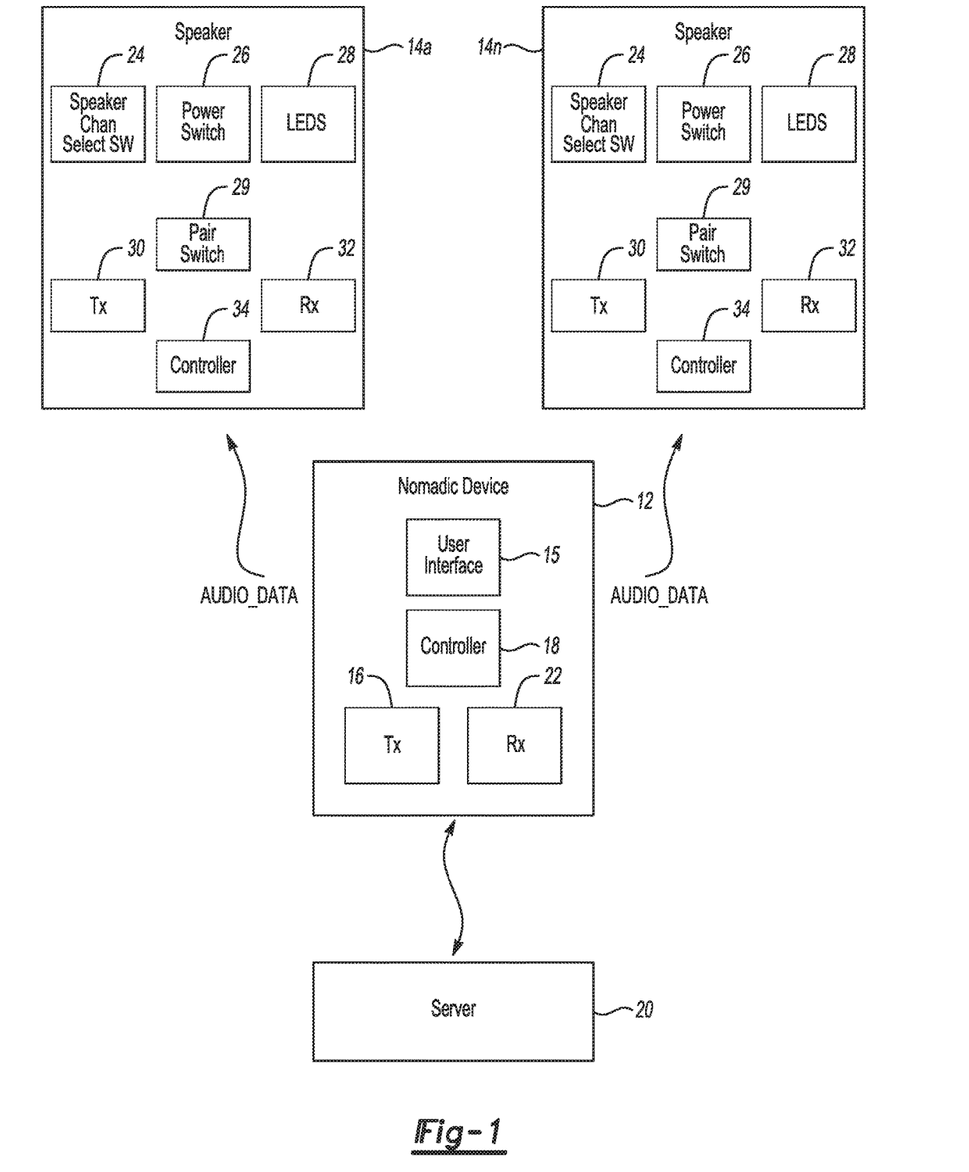
FIG. 1 depicts an apparatus for transmitting data to one or more portable speakers in accordance to one embodiment.

FIG. 1 depicts an apparatus 10 for controlling one or more portable speakers 14 in accordance to one embodiment. The apparatus 10 generally includes a nomadic device 12 and the plurality of speakers 14a-14n ("14"). The nomadic device 12 may be implemented as, but not limited to, a cell phone (e.g., smartphone, i-Phone®, etc.), a handheld computer (e.g., a personal digital assistant ("PDA"), etc.), a tablet (e.g., i-Pad®, etc.), a portable audio device (e.g., i-Pad®, etc.) or other suitable variant thereof. In general, the nomadic device 12 is configured to download and run a custom application written in any open/non-open operating system, real time operating system (RTOS), embedded operating system (e.g., Linux®, Windows®, Android®, Symbian®, Maemo®, etc.) for transmitting audio data therefrom. The nomadic device 12 generally includes a user interface 15 such as a touch screen or voice recognition selection device to enable a user to select various settings therein for providing the audio data to the speakers 14.

The nomadic device 12 includes a transmitter 16 for wirelessly transmitting the audio data to the speakers 14 for playback. The device 12 may transmit such audio data to the speakers 14 via a wireless protocol. Such a wireless protocol may include Bluetooth® or other suitable format. In another example, the nomadic device 12 may also transmit the audio data to the speaker 14 via WiFi® or other suitable format. The nomadic device 12 includes a controller 18 for executing the application to enable the transmission of the audio data to the speakers 14. The audio data may be in the form of, but not limited to, the following file formats: way, mp3, wma, etc. The nomadic device 12 is further configured to communicate via the WiFi connection to a server 20 in order to retrieve and store any number of the foregoing audio data for playback.

The nomadic device 12 may also be configured to transmit data to the speakers 14 when the nomadic device 12 receives such data from an external source. For example, the nomadic device 12 may receive the audio data as it is broadcast from a radio station (or tower) via frequency modulation (FM) or amplitude modulation (AM), etc. The nomadic device 12 includes a receiver 22 for receiving the audio data as it is broadcast or streamed from the tower. The nomadic device 12 may include also include a media player for adding an open or non-open audio post processing module or audio enhancement module to the audio data.

The nomadic device 12 is further configured to receive custom inputs from a user at the user interface 15. Such inputs may relate to, volume control, audio equalizer, panning, audio post processing or any other input that may modify the manner in which the audio is played back over the speakers 14. Each speaker 14 may include a channel select switch 24, a power switch 26, one or more light emitting diodes (LEDs) 28, and a pair switch 29. The relevance of the channel select switch 24, the power switch 26, the LEDs 28, and the pair switch 29 will be discussed in more detail below.

In general, the plurality of speakers 14 may transmit the audio data for playback to a user as received from the nomadic device 12 in either a monophonic ("mono"), a stereophonic ("stereo") mode, or surround sound mode. For example, the nomadic device 12 is configured to transmit the audio data from two independent channels, a left channel and a right channel. The audio data as transmitted from the nomadic device 12 may comprise different components (or sounds) such as vocals, instruments, etc. In the event each speaker 14 (or a single speaker) plays back the same components of the audio data as received from the nomadic device 12, then each speaker 14 in the apparatus 10 is operating in the mono mode. In the event each speaker 14 plays back different components of the audio data as received from the nomadic device 12, then each speaker 14 is operating in the stereo mode. The use of multiple channels (e.g., left, right, dolby digital 5.1, etc.) enables the speakers 14 to playback the audio data in stereo. Additional channels, such as multiple discrete audio channels may be routed from the nomadic device 12 to an array of speakers 14 to achieve a surround sound effect.

The channel select switch 24 may be selected by the user to enable the speaker 14 to playback the audio data on either the left channel or the right channel. For example, the user may use the channel select switch 24 on a first speaker 14 to assign the first speaker 14 to playback the audio data on the left channel. The user may use the channel select switch 24 on a second speaker 14 to assign the second speaker 14 to playback the audio data on the right channel. In addition, the nomadic device 12 is configured to receive an input from the user which is indicative of the distance "d" between two speakers 14. The nomadic device 12 may post process the audio data as transmitted therefrom based on the distance between the speakers 14 to enhance the quality of audio playback. For example, the nomadic device 12 may mix audio information at the left channel and at the right channel based on the actual distance between any two speakers 14 so that the audio data is played back therefrom at a center channel. In this case, the audio data as played back from a first and a second speaker 14 may provide the user with the experience that he/she is positioned at a center between the first and the second speakers 14 when perhaps he/she is not actually positioned at the center between the first and the second speakers 14.

The nomadic device 12 may also include a virtual speaker algorithm that creates a surround effect when two or more speakers 14 are used. The virtual speaker device may use the distance of the speakers 14 to create the surround sound effect. The nomadic device 12 may also include a stereo widener algorithm that creates the illusion that the speakers 14 are positioned further apart than they really are. For example, a user may enter a desired distance between any two speakers 14 even if the speakers 14 are not physically located at the desired distance into the nomadic device 12. The nomadic device 12 mixes the left and the right channels and provides the audio data such that the speakers 14 playback the audio data at the center channel. The sound played back from the speakers 14 at the center channel may appear to be based on the desired distance as input by the user. However, again the speakers 14 may not be physically located at such a distance away from each other. This may be the case in which a user has his/her speakers 14 positioned in a small room, but desires to simulate the condition in which the speakers 14 are positioned in a room that is larger than the small room. In this case, the stereo widener algorithm creates a center channel (or pseudo center channel) that is based on the greater distance between the two speakers 14 as opposed to the actual distance to achieve the center effect desired by the user.

The speakers 14 may be daisy chained to one another via a hardwire connection or wirelessly, for example, via Bluetooth® or other suitable format. Each speaker 14 includes a transmitter 30 and a receiver 32 for enabling the wireless connection between one another. Each speaker 14 also includes a controller 34 for receiving the information from the nomadic device 12 and/or the other speakers 14. The controller 34 generally includes both hardware and software for performing operations as noted herein. Each speaker 14 may be powered by a portable battery or other power source.

The nomadic device 12 may enable a user to provide, via the user interface 15, configurable data to speaker size which further provides a corresponding crossover frequency (or operational frequency) for the speaker 14. The nomadic device 12 may use such information along with the stereo widening algorithm for enhanced stereo playback. In general, each speaker 14 may playback the audio data at a working frequency range. For example, in the event the speaker 14 is a woofer, such a speaker 14 may play back the audio data within a range of 20 Hz-200 Hz. In the event the speaker 14 is a mid-range driver, such a speaker 14 may playback the audio data within a range of 200 Hz-2 kHz. In the event the speaker 14 is a tweeter, such a speaker 14 may playback the audio data within a range of 2 kHz-20 kHz While each speaker 14 is generally configured to playback the audio data at a particular crossover frequency, the input provided to each speaker 14 should match the crossover frequency at which the respective speaker 14 plays back the audio data. Thus, the nomadic device 12 may be configurable such that a particular crossover frequency is selected thereon by the user to enable the nomadic device 12 to transmit the audio data at the crossover frequency for playback at the speaker 14 within the desired frequency range. This condition may minimize or mitigate the potential for the speaker 14 to be damaged in the event the data was transmitted from the nomadic device 12 at the incorrect frequency. The user may enter the crossover frequency into the nomadic device 12 or alternatively select the speaker type (e.g., woofer, mid-range driver, of tweeter) with default crossover frequencies that are assigned or defaulted thereto. In another example, the user may type in the particular speaker manufacturer and/or model number (or other identifier) such that the nomadic device 12 retrieves the corresponding crossover frequency from the speaker manufacturer website via internet connection.

The nomadic device 12 may also employ special sound processing to enable the speaker 14 to receive the audio at the appropriate crossover frequency. For example, the nomadic device 12 may employ a bass boost such that in the event the speaker 14 may have a crossover frequency that starts at a high frequency (e.g., 150 Hz), the nomadic device 12 may modify frequency at which the audio data is played back from the portable speaker 14 even though the crossover frequency of the speaker 14 is high. In this case, the bass boost of the nomadic device 12 may modify the audio data as transmitted therefrom to be received at 150 Hz, however when played at the speaker 14, such audio data may be played back and sound as if it was less than 150 Hz to sound like a bass speaker. In other words, the nomadic device 12 may process the audio data to be received at the desired frequency of the speaker 14, however the speaker 14 plays back the audio data that appears to be played back at a different frequency.

Each speaker 14 may need to be paired to the nomadic device 12 in order to receive the audio data. The manner in which the speaker 14 is paired to the nomadic device 12 will be described in more detail in connection with FIG. 3. Each speaker 14 may be configured to enter into a friend mode in which a corresponding speaker 14 can be activated to decode the audio data at a various channel (e.g., left or right, etc.) as provided by the nomadic device 12. This will be described in more detail in connection with FIG. 4.

The nomadic device 12 may include low-bitrate enhancers which increases the overall sound quality of audio files that were stored thereto based on a smaller file size. In addition, the nomadic device 12 may be configured to perform upmixing and provide multi-channel enhancements. For example, upmixing generally refers to converting an "n" channel source to "more than n" sources. Specifically, a two channel source may be upmixed to a 5.1 channel source. The upmixing may be performed by utilizing Logic7®, Dolby Pro Logic®, etc. Multichannel enhancements generally refer to any audio processing that can enhance front/center/rear sound in a multichannel audio (e.g., stable center extraction).

In the event the nomadic device 12 is implemented as a tablet or laptop computer, the nomadic device 12 may store various settings such as volume, bass, equalizer, etc. for users who share the nomadic device 12. For example, a number of family members may share the nomadic device 12 and store personal settings associated with volume, bass, equalizer such that the audio data is played back in accordance to those settings as specified for a particular family member. The nomadic device 12 may prompt the user to select the settings profile as previously established or simply enable the user to select previously established settings profile from among those established from other members. Such information may be transmitted to the server 20 for later retrieval from another nomadic device 12. Accordingly, the user has the option of uploading the stored settings as saved on an initial nomadic device 12 on to another nomadic device 12. For example, this may be suitable in moments in which the nomadic device 12 is a cell phone and the user obtains a new cell phone and desires to keep the audio settings already established in the old cell phone. Such data can be stored on the server 20 and retrieved for storage on the new cell phone.

It is recognized that the speakers 14 may not need additional processing thereon since such processing is provided by the nomadic device 12. For example, as noted above, the nomadic device 12 may include hardware and/or software for performing stereo widening, speaker cross over (e.g., bass boost), and virtual speaker processing such that the speaker 14 generally plays back the audio data with no special processing being utilized thereon. It is further recognized that any number of speakers 14 may be operably coupled to the nomadic device 12 and that such speakers 14 are portable and are capable of being mounted on any number of vertical and horizontal surfaces (e.g., a wall, bed side, table top, etc.).

Figure 2:
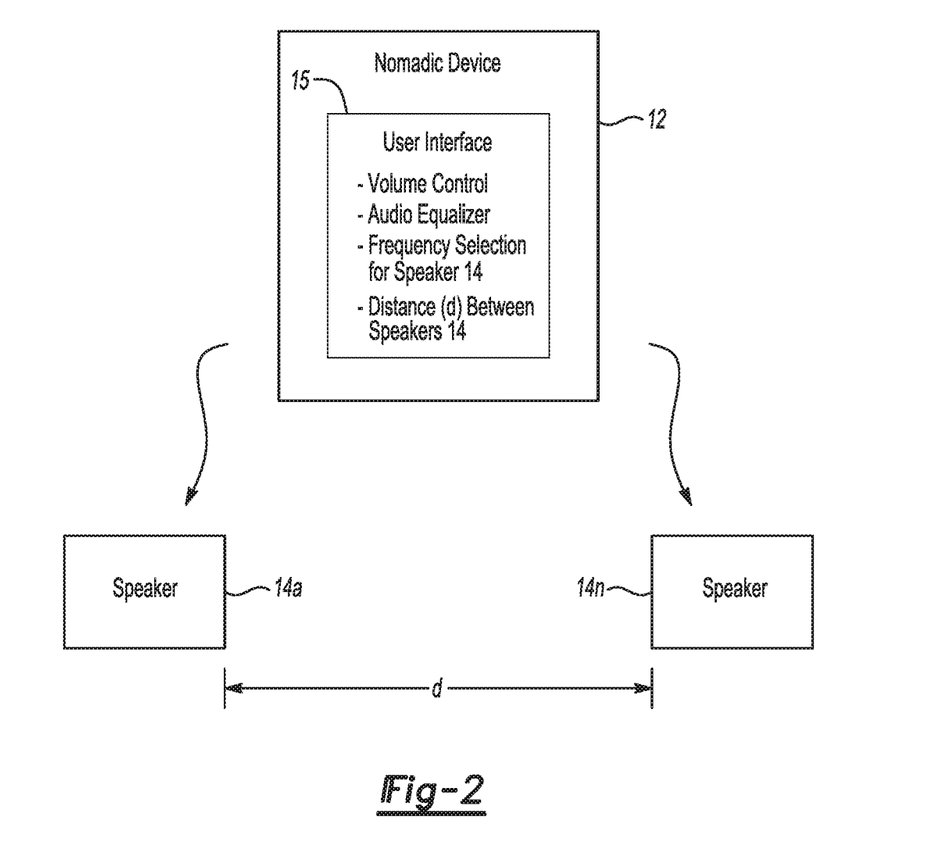
FIG. 2 depicts a nomadic device including a user interface for enabling user selectable options in accordance to one embodiment.

FIG. 2 depicts the nomadic device 12 including the user interface 15 for providing selectable options in accordance to one embodiment. As noted above, the nomadic device 12 may allow the user to select the volume at which the audio data is played back at one or more of the speakers 14 and may also allow for the user to adjust the tone and/or bass for the audio data. In addition, the nomadic device 12 may also allow the user to select fade characteristics between the speaker 14 assigned to the left channel and the speaker assigned to the right channel. Further, the nomadic device 12 may also allow the user to input the distance (e.g., meters or feet) between at least two corresponding speakers 14 as well as to provide the crossover frequency to meet a particular frequency requirement for the speaker 14 as noted above.

Figure 3A:
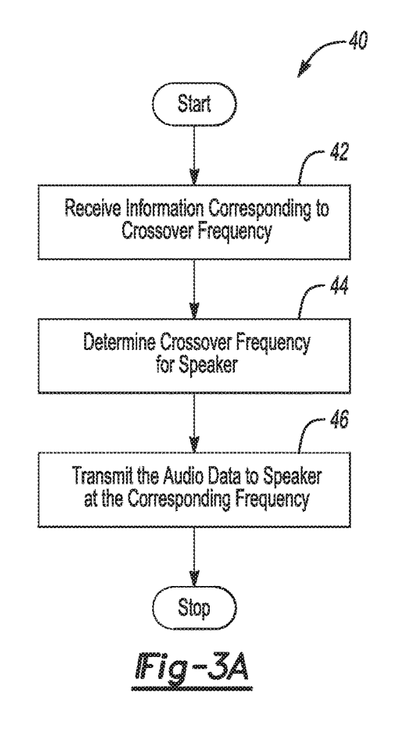
FIGS. 3A-3C depict various methods for enabling the user selectable options in accordance to one embodiment.

FIG. 3A depicts a method 40 for providing speaker crossover frequency to the nomadic device 12 in accordance to one embodiment.

In operation 42, the nomadic device 12 receives information corresponding to the crossover frequency for a particular speaker 14. As noted above, the user may enter the crossover frequency into the nomadic device 12 or alternatively select the speaker type (e.g., woofer, mid-range driver, of tweeter) with default crossover frequencies that are assigned or defaulted thereto. In another example, the user may type in the particular speaker manufacturer and/or model number (or other identifier) such that the nomadic device 12 retrieves the corresponding crossover frequency from the speaker manufacturer website via internet connection.

In operation 44, the nomadic device 12 determines the crossover frequency for the speaker 14.

In operation 46, the nomadic device 12 transmits the audio data to the speaker 14 at the crossover frequency as specified.

Figure 3B:
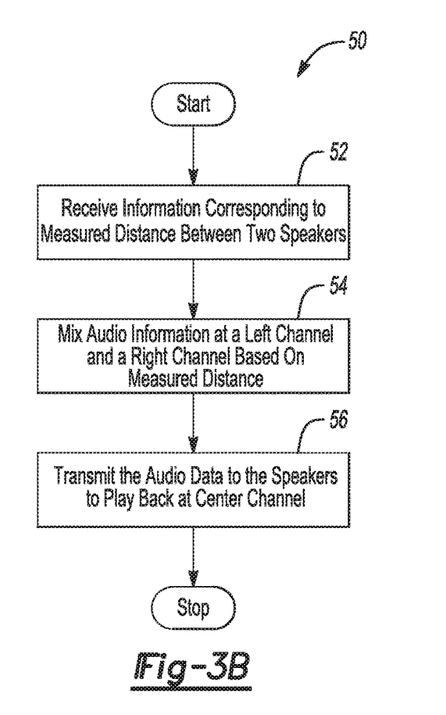

FIG. 3B depicts a method 50 for providing a measured distance between two speakers 14 in accordance to one embodiment.

In operation 52, the nomadic device 12 receives information corresponding to a measured distance between the first portable speaker 14 and the second portable speaker 14.

In operation 54, the nomadic device 12 mixes audio information at the left channel and at the right channel based on the measured distance.

In operation 56, the nomadic device 12 transmits the mixed audio data to the first portable speaker 14 and the second portable speaker 14. In this case, the audio data as played back from a first portable speaker 14 and the second portable speaker 14 may provide the user with the experience that he/she is positioned at a center between the first and the second portable speakers 14 when perhaps he/she is not actually centrally positioned between such speakers 14.

Figure 3C:
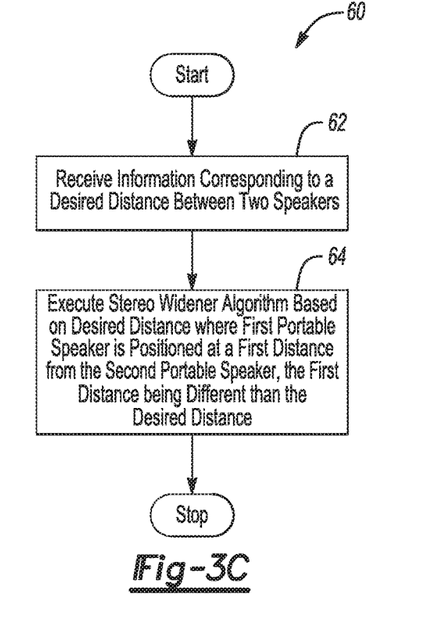

FIG. 3C depicts a method 60 for providing a desired distance between two speakers 14 in accordance to one embodiment.

In operation 62, the nomadic device 12 receives information corresponding to a desired distance between the first portable speaker 14 and the second portable speaker 14.

In operation 64, the nomadic device 12 executes the stereo widener algorithm based on the desired distance. For example, when the nomadic device 12 executes the stereo widener algorithm, the nomadic device 12 mixes the left and the right channels and provides the audio data such that the speakers 14 playback the audio data at the center channel. The sound played back from the speakers 14 at the center channel may appear to be based on the desired distance as input by the user. However, again the speakers 14 may not be physically located at such a distance away from each other. This may be the case in which a user has his/her speakers 14 positioned in a small room, but desires to simulate the condition in which the speakers 14 are positioned in a room that is larger than the small room. In this case, the stereo widener algorithm creates a center channel (or pseudo center channel) that is based on the greater distance between the two speakers 14 as opposed to the actual distance to achieve the center effect desired by the user.

Figure 4:
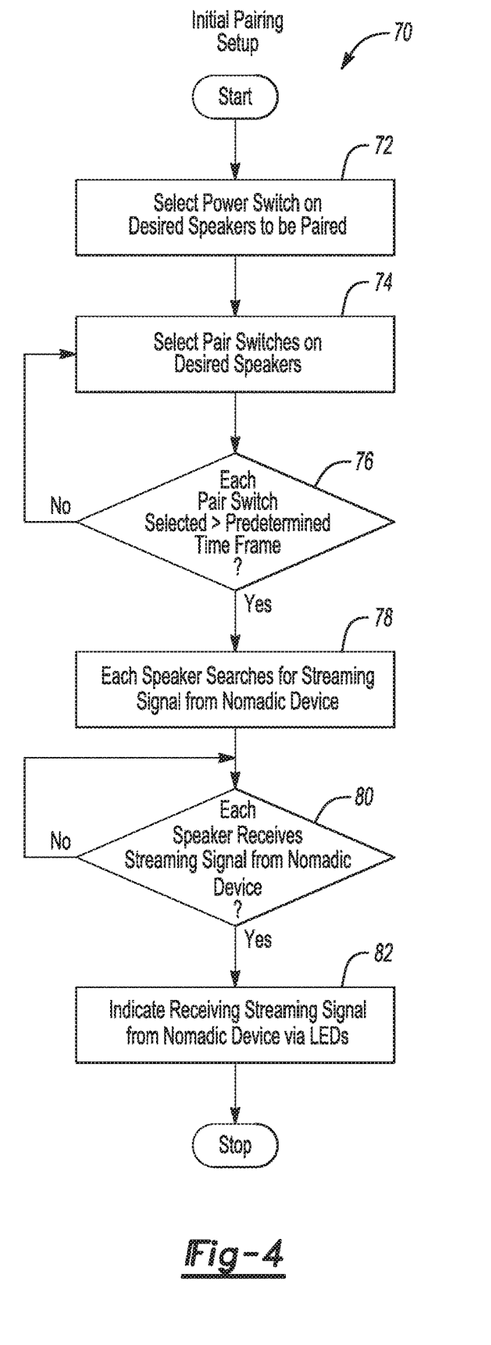
FIG. 4 depicts a method for performing an initial pairing setup between a nomadic device and the one or more speakers in accordance to one embodiment.

FIG. 4 depicts a method 70 for performing an initial pairing setup between the nomadic device 12 and the one or more speakers 14 in accordance to one embodiment. The method 50 generally configures the one or more speakers 14 to receive the audio data from the nomadic device 12.

In operation 72, the power switch 26 for all of the desired speakers 14 that are to be paired to the nomadic device 12 are selected to power the same.

In operation 74, the pair switch 29 for all of the desired speakers 14 are depressed for a period of time.

In operation 76, the controller 34 for each desired speaker 14 determines whether the corresponding pair switch 26 has been depressed for a predetermined amount of time. If this condition is true, then the method 70 moves to operation 78. If not, then the method 70 moves back to operation 74.

In operation 78, each desired speaker 14 monitors for the receipt of the audio data from the nomadic device 12 via the receiver 32. The LEDs 28 of the desired speaker 14 may blink for predetermined intervals to indicate to the user that the speaker 14 is in the pairing mode. In this operation, it is presumed that the nomadic device 12 is activated and actively transmitted audio data prior to each speaker 14 monitoring receipt of the audio data.

In operation 80, the controller 34 for each desired speaker 14 determines whether the audio data is being received from the nomadic device 12. If this is the case, then the method 70 moves to operation 82. If not, then the method 70 remains in operation 80.

In operation 82, the controller 34 activates the LEDs 28 which remains on for each desired speaker 14 to indicate that the speaker 14 has been successfully paired to the nomadic device 12. It is recognized that a single speaker 14 may be paired to the nomadic device 12 at a time or that multiple speakers 14 may be paired to the nomadic device 12 at a time. In addition, by virtue of the speaker 14 playing back the audio data, such an indication will indicate to the user that the speaker 14 is successfully paired to the nomadic device 12. The activation of the LEDs 28 may be beneficial in the event multiple speakers 14 are desired to be paired as it may be difficult to ascertain which one of a number of speakers 14 are paired and playing back the audio data unless the user manually check by listening for audio output from each speaker 14.

Figure 5:
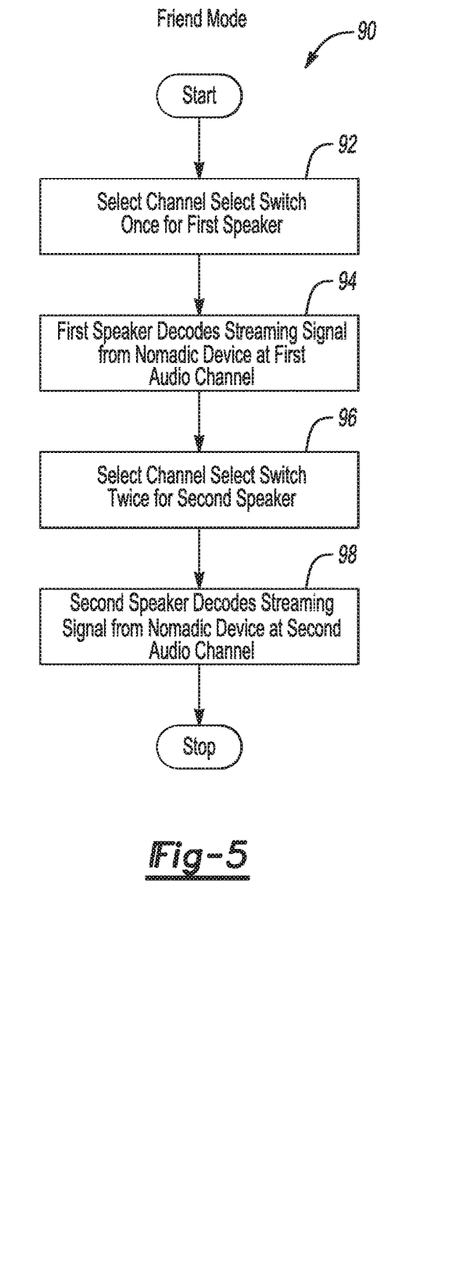
FIG. 5 depicts a method for placing the one or more portable speakers in a friend mode in accordance to one embodiment.

FIG. 5 depicts a method 90 for placing the one or more portable speakers 14 in a friend mode in accordance to one embodiment. In the friend mode, one speaker 14 may be selected to decode audio data from the nomadic device 12 at a first channel while another speaker 14 may be selected to decode audio data from the nomadic device 12 at a second channel. The method 80 generally applies to a multiple speaker implementation such that each speaker 14 may be selected to decode the audio data as received from the nomadic device 12 at a particular channel. It is recognized that the speaker(s) 14 are generally already paired to the nomadic device 12 before placing the speaker 14 in the friend mode. It is recognized that the speaker 14 can be placed in the friend mode prior to pairing the speakers 14 to the nomadic device 12. In this example, the speaker 14 may be configured to decode the audio data once received (i.e., once paired) at the channel selected.

In operation 92, the controller 34 of a first speaker 14 detects that a user has selected a particular channel (e.g., left or right channel) for the first speaker 14 to decode the audio data via the channel select switch 24.

In operation 94, the first speaker 14 decodes the audio data as received from the nomadic device 12 at the selected channel (e.g., left or right channel) and plays back the audio data for the user.

In operation 96, the controller 34 of a second speaker 14 detects that the user has selected a particular channel (e.g., left or right channel) for the second speaker 14 to decode the audio data via the channel select switch 24. It is assumed that the channel selected to be decoded at the second speaker 14 will be different than the channel selected at the first speaker 14.

In operation 98, the second speaker 14 decodes the audio data as received from the nomadic device 12 at the selected channel (e.g., left or right channel) and plays back the audio data for the user.

It is contemplated that operations 92 and 94, or 96 or 98 may be repeated for a third speaker 14 in which a channel select switch 24 thereof may be used to enable the third speaker 14 to decode data at a third channel (e.g., dolby digital 5.1 or other suitable channel).

In the event a channel select switch 24 is not selected, then the speaker 14 is generally configured to transmit the audio data for playback to a user as received from the nomadic device 12 in the mono mode. The activation of the channel select switch 24 on a particular speaker 14 is an indication to the speaker 14 that it is in the friend mode, or that the particular speaker 14 will be providing the audio playback along with another speaker 14.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-program product embodied in a non-transitory computer read-able medium that is programmed for transmitting audio data to at least one portable speaker for audio playback, the computer-program product comprising:
   instructions for receiving first information via a user interface, the first information being indicative of a first crossover frequency for a first portable speaker to playback audio data;
   instructions for wirelessly transmitting the audio data to the first portable speaker in response to receiving first information via the user interface;
   instructions for receiving second information via the user interface indicative of a measured distance between the first portable speaker and a second portable speaker; and
   instructions for mixing audio information at a left channel and at a right channel based on the measured distance as received via the user interface.

2. The computer-program product of claim 1 further comprising instructions for receiving third information via the user interface, the third information being indicative of a second crossover frequency for the second portable speaker, wherein the second crossover frequency is different than the first crossover frequency.

3. The computer-program product of claim 2 further comprising instructions for determining the second crossover frequency for the second portable speaker based on the third information.

4. The computer-program product of claim 2 further comprising instructions for wirelessly transmitting the audio data to the second portable speaker in response to receiving the third information via the user interface, the audio data being wirelessly transmitted in accordance to the second crossover frequency to enable the second portable speaker to playback the audio data.

5. The computer-program product of claim 2, wherein the first information corresponds to a first speaker type for the first portable speaker and the third information corresponds to a second speaker type for the second portable speaker.

6. The computer-program product of claim 1 further comprising instructions for wirelessly transmitting the audio data to the first portable speaker and to the second portable speaker after mixing the audio information, the first portable speaker and the second portable speaker for playing back the audio data at a center channel after mixing the audio information at the left channel and at the right channel.

7. The computer-program product of claim 1 further comprising instructions for:
   receiving third information via the user interface, the third information being indicative of a desired distance between a first portable speaker and a second portable speaker; and
   executing a stereo widener algorithm based on the desired distance as received via the user interface to cause the audio data to be played back with an appearance that the first portable speaker is positioned at the desired distance from the second portable speaker, wherein the first portable speaker is physically positioned at a first distance from the second portable speaker and the first distance being different than the desired distance.

8. An apparatus for receiving audio data from a nomadic device, the apparatus comprising:
   a first portable speaker for being operably coupled to the nomadic device that (i) receives first information via a user interface, the first information being indicative of a first crossover frequency for the first portable speaker to playback audio data, (ii) wirelessly transmits the audio data to the first portable speaker in response to the first information, (iii) receives second information via the user interface, the second information being indicative of a measured distance between the first portable speaker and a second portable speaker, and (iv) mixes audio information at a left channel and at a right channel based on the measured distance as received via the user interface.

9. The apparatus of claim 8, wherein the second portable speaker is configured to be operably coupled to the nomadic device that receives third information via the user interface, the third information being indicative of a second crossover frequency, wherein the second crossover frequency is different than the first crossover frequency.

10. The apparatus of claim 9, wherein the first information corresponds to a first speaker type for the first portable speaker and the third information corresponds to a second speaker type for the second portable speaker.

11. The apparatus of claim 9, wherein the nomadic device determines the second crossover frequency for the second portable speaker based on the third information.

12. The apparatus of claim 11, wherein the second portable speaker is configured to wirelessly receive the audio data from the nomadic device at the second crossover frequency to enable playback of the audio data therefrom.

13. The apparatus of claim 11, wherein the first portable speaker is configured to playback the audio data at the first crossover frequency.

14. A computer-program product embodied in a non-transitory computer read-able medium that is programmed for transmitting audio data to at least one portable speaker for audio playback, the computer-program product comprising:
   instructions for receiving first information via a user interface, the first information being indicative of a first crossover frequency for a first portable speaker to playback audio data;
   instructions for wirelessly transmitting the audio data to the first portable speaker in response to the first information;
   instructions for receiving second information via the user interface, the second information being indicative of a desired distance between a first portable speaker and a second portable speaker; and
   instructions for executing a stereo widener algorithm based on the desired distance to cause the audio data to be played back with an appearance that the first portable speaker is positioned at the desired distance from the second portable speaker.

15. The computer-program product of claim 14 further comprising:
instructions for receiving third information via the user interface indicative of a measured distance between the first portable speaker and a second portable speaker; and
instructions for mixing audio information at a left channel and at a right channel based on the measured distance as received via the user interface.

16. The computer-program product of claim 14, wherein the first portable speaker is physically positioned at a first distance from the second portable speaker and the first distance is different than the desired distance.

17. An apparatus for receiving audio data from a nomadic device, the apparatus comprising:
a first portable speaker for being operably coupled to the nomadic device that (i) receives first information via a user interface, the first information being indicative of a first crossover frequency for the first portable speaker to playback audio data, (ii) wirelessly transmits the audio data to the first portable speaker, (iii) receives second information via the user interface, the second information being indicative of a desired distance between the first portable speaker and a second portable speaker, and (iv) executes a stereo widener algorithm based on the desired distance to cause the audio data to be played back with an appearance that the first portable speaker is positioned at the desired distance from the second portable speaker.

18. The apparatus of claim 17, wherein the first portable speaker is physically positioned at a first distance from the second portable speaker and the first distance being different than the desired distance.

* * * * *